United States Patent [19]

Palac et al.

[11] 4,236,184

[45] Nov. 25, 1980

[54] MULTI-FUNCTION STRUCTURE FOR A COLOR CATHODE RAY TUBE

[75] Inventors: Kazimir Palac, Carpentersville; Raymond M. Stachniak, Wheaton, both of Ill.

[73] Assignee: Zenith Radio Corporation, Glenview, Ill.

[21] Appl. No.: 945,766

[22] Filed: Sep. 25, 1978

[51] Int. Cl.$^3$ .......................... H04N 5/65; H04J 29/06

[52] U.S. Cl. .......................................... 358/245; 358/246; 315/8

[58] Field of Search ...................... 358/245, 246; 315/8

[56] References Cited

U.S. PATENT DOCUMENTS

| | | | |
|---|---|---|---|
| 2,907,914 | 10/1959 | Brownell | 358/245 |
| 2,962,622 | 11/1960 | Popovich | 315/8 |
| 3,996,491 | 12/1976 | Larson et al. | 358/246 |

*Primary Examiner*—Robert L. Griffin
*Assistant Examiner*—Edward L. Coles
*Attorney, Agent, or Firm*—John H. Coult

[57] ABSTRACT

A multi-function system for use in a color television picture tube having a glass bulb includes a funnel and a faceplate with a rearward flange which mates with and is sealed to the funnel. A pre-formed coil of electrically conductive wire engirds the flange of the faceplate. The coil includes terminal means for connecting the coil to a source of degaussing current for abating residual stray magnetic fields within the tube. Annular enclosure means surrounds the flange and defines an enclosure containing the coil. A body of hardened binder is formed in the enclosure. The body is reinforced by the coil of wire and serves to provide implosion protection for the tube.

7 Claims, 1 Drawing Figure

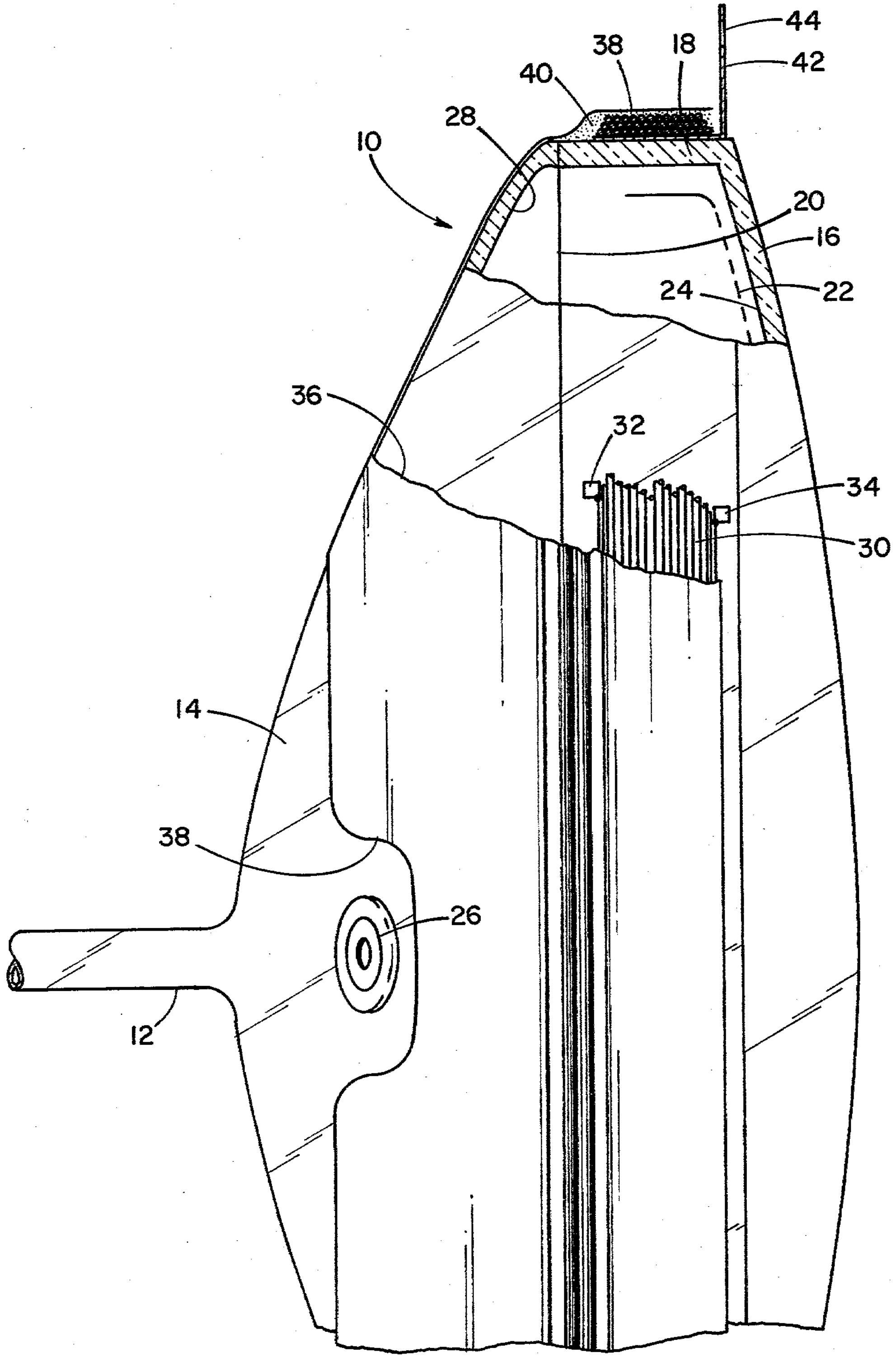
44
42
38
18
40
28
10
20
16
22
24
36
32
34
30
14
38
26
12

MULTI-FUNCTION STRUCTURE FOR A COLOR CATHODE RAY TUBE

BACKGROUND OF THE INVENTION

This application relates to color cathode ray tubes, and more particularly to an improvement which makes possible a reduction in the cost of certain components of a color CRT (cathode ray tube) of the shadow mask type. Color cathode ray tubes today include a number of auxiliary components which are deemed to be necessary to provide, with a high degree of personal safety and under a wide variety of operating conditions, the high quality pictures which the consuming public demands.

It is common practice to provide on a color CRT a magnetic shield for shielding the interior of the bulb from the earth's magnetic field and other stray ambient fields. It is known to locate the magnetic shield in the bulb's interior—see U.S. Pat. Nos. 3,549,932-Lindeman and 3,822,453-Shrader. In other prior art disclosures a magnetic shield is located on the outside of the bulb—see U.S. Pat. No. 3,422,220-Bathelt et al; U.S. Pat. No. 3,417,201-Joseph et al; U.S. Pat. No. 2,890,362-Francken, and U.S. Pat. No. 3,430,985-Ammerman et al. See also *Color Television Picture Tubes* by Morrell et al, Academic Press, 1974, pp. 112–114. The external shield is the more popular arrangement in commercial use.

Another common color CRT component is a "degaussing" coil provided to insure that the purity of the colors reproduced on the screen of the tube are not degraded by the effects of the earth's magnetic field or other stray ambient magnetic fields. Typically a degaussing coil is mounted so as to surround the color CRT bulb immediately rearwardly of the screen area. A decaying sinusoidal electrical current is passed through the coil, usually as an automatic consequence of the initiation of tube operation or some other predictable event.

The effect of energizing the degaussing coil is to demagnetize the magnetic shield (if any) and the shadow mask assembly, as well as any other magnetizable structures in the tube which have picked up a spurious magnetism capable of diverting the electron beams from their intended flight path and thus cause color impurity in the reproduced pictures. The degaussing coil is connected at each end to a degaussing circuit in the chassis of the television receiver, from which circuit it receives an appropriate degaussing current. Typical U.S. patents depicting prior art degaussing structures are: U.S. Pat. No. 3,322,998-Norley; 3,324,343-Norley; 3,340,433-Reith et al; 3,344,307-Van Anrooy et al; 3,404,307-Hayden; 3,433,993-Norley; 3,657,729-Hansen et al; 3,699,400-Marsh, Jr. See also the Morrell et al text at pp. 112–114.

The prior art also discloses aggregating into a single assembly degaussing coils and an external, or internal-external magnetic shield; see U.S. Pat. No. 3,340,417-Panis et al and U.S. Pat. No. 3,867,668-Shrader.

A patent to Brownell U.S. Pat. No. 2,907,914 discloses for a round-type color CRT a coiled strip magnetic shield designed to permit passage of a D.C. current for the purpose of causing the strip "to operate at a higher point on its magnetization curve and thus effectively increase the permeability of the shielding material." The strip also serves, when energized with a D.C. current, as a "field neutralizing coil." In this connection see also British Pat. No. 1,129,167 and U.S. Pat. No. 2,860,328-Langworthy.

Further, it is necessary to prevent the bulb from imploding should the bulb be fractured by a missile or otherwise be suddenly devacuated. Conventionally, color television picture tubes have an evacuated glass bulb which includes a faceplate with a rearward flange and a funnel sealed to the faceplate flange along a planar sealing interface. The faceplate has a concave inner surface upon which is deposited a cathodoluminescent phosphor screen. Due to the high vacuum in the bulb, several tons of atmospheric pressure are exerted on the faceplate causing the bulb to be susceptible to implosion (The term "implosion" is defined by Underwriter's Laboratory Incorporated as a "rapid and sudden inward bursting of a high-vacuum glass envelope.") It is of the utmost importance in the interest of safety to prevent the bulb from violently imploding should, for example, it be struck by a heavy missile.

There have evolved a number of approaches to implosion protecting color CRT's (cathode ray tubes) of the described type having a conventional bulb (with a flanged faceplate). One approach is implemented in systems referred to as "rimbond" systems. The rimbond system has a metal frame which surrounds the flange found on every conventional faceplate. A small gap between the frame and the faceplate flange is filled with a cement—typically an epoxy resin. In a rimbond system, the frame is not under tension. The cement contains the glass shards of a shattered faceplate long enough to permit gradual (and therefore nonviolent) devacuation of the bulb. Exemplary U.S. patents illustrating rimbond systems are U.S. Pat. Nos. 3,485,407; 3,558,818; 3,412,203 and 3,835,250. A major drawback to rimbond systems has been the large amount of (very costly) epoxy cement required.

A second basic implosion protection approach is termed the "tension band" approach. Systems implementing this approach comprise a band which is placed around the faceplate flange and put under very high tension. The tension band around the faceplate flange constricts the flange and, like the rimbond systems, holds the shards of a fractured faceplate in position until the bulb has gradually-devacuated. Numerous patents have been issued on various aspects of tension band systems. See U.S. Pat. Nos. 3,818,557; 3,456,076; 3,556,306; 3,597,537; 3,777,057; 3,845,530; 3,890,464; 3,332,564; 3,220,593; and 3,332,570.

Another approach is to bond a transparent protective shield over the front surface of the faceplate. Systems following this approach are commonly termed "bonded panel" systems. See the Morrell et al text. pp. 111–112.

Yet another approach to implosion-protecting color CRT's with conventional faceplates involves using an expansible frame and a tension band to constrain the expansibility of the frame. The frame comprises an overlapped air of "C"-shaped half-frames. A viscous epoxy cement is typically applied to each of the half-frames; the half-frames are then placed around the faceplate flange with their ends overlapping. Before the cement has set, a tension band is drawn up tightly around the frame and faceplate flange. It is common to use a lighter weight tension band than is used in a pure tension band system. See U.S. Pat. No. 3,845,530-Platt.

A U.S. Pat. No. 3,647,960-Takemoto et al discloses an implosion protection system for a color CRT which comprises a series of closely spaced, mutually insulated turns of wire wrapped around the flange of the faceplate. An electrical current is passed through the wire to polymerize a polymerizable coating on the wire.

A patent to Powell et al-U.S. Pat. No. 3,519,161 discloses the use of one or a limited number of closed loops of reinforcing wire around the flange of a faceplate of a cathode ray tube of the conventional type to enhance the resistance of the tube to implosion. The wire loops may be tensed or relaxed. The loops may be covered by a layer of glass or epoxy cement.

U.S. Pat. No. 3,166,211-Stel et al discloses an implosion protection system for a CRT comprising a fiber-impregnated sheath on the exterior of the CRT bulb. In one embodiment, glass fibers are embedded in a cord which is wrapped around and bound to the exterior of a tube to provide implosion protection. The following patents disclose implosion systems for flangeless faceplate tubes: U.S. Pat. Nos. 4,004,092-Rogers; 4,016,364-Rogers; 4,021,850-Rogers; 4,084,193-Palac; 4,037,255-Hill; and 4,054,913-Lerner. U.S. Pat. No. 4,084,193 teaches the use of a tension band in the form of a tightly wound coil of wire.

A U.S. Pat. No. 2,222,197 to Engels discloses a CRT in which the bulb comprises a flangeless faceplate inset in an expanded open end of a cooperating funnel. A band allegedly providing implosion protection surrounds the outside of the funnel near the open end thereof.

A fourth exterior component of a color CRT is the "outer conductor." To provide a large capacitor for filtering the high voltage applied to the CRT screen, electrically conductive coatings are applied to the inner and outer surfaces of the CRT funnel. It is taught in U.S. Pat. No. 3,614,519-Figlewicz et al that a high permeability foil jacket form-fitted to the outer surface of the funnel may serve as a combined magnetic shield and outer conductor.

A fifth necessary exterior CRT component is a system providing for mounting the tube in a television chassis. The above-identified patents disclose numerous types of mounting brackets and other structures for mounting a tube in a TV chassis.

OBJECTS OF THE INVENTION

It is an object of this invention to reduce the cost of manufacture of a color CRT without loss of performance thereof by providing a system capable of providing the functions of at least four of the above-mentioned tube components.

More specifically, it is an object to provide a multiple function structure which is mounted on the exterior of a shadow mask color CRT and which provides or assists in providing means for accomplishing at least the required magnetic shielding, degaussing, implosion protection, and tube mounting functions.

BRIEF DESCRIPTION OF THE DRAWINGS

The features of the invention which are believed to be novel are set forth with particularity in the appended claims. The invention together with further objects and advantages thereof, may best be understood, however, by reference to the following description taken in conjunction with the accompanying drawings, and in which the FIGURE is a fragmentary, partially sectioned, elevational view of a color cathode ray tube embodying the present invention.

DESCRIPTION OF THE PREFERRED EMBODIMENT

This invention is directed to the provision of a structure which is mounted on the exterior of a shadow mask color cathode ray tube and which, in a single assembly, performs the functions of the degaussing, magnetic shielding, implosion protecting and tube mounting structures of conventional tubes. By the provision according to this invention of a single structure displacing a number of the aforesaid conventional discrete structures, significant cost savings may be effected.

FIG. 1 illustrates an application of the principles of the present invention to a tube having a conventional glass bulb 10. The bulb 10 comprises a conventional neck 12, funnel 14 and faceplate 16. The faceplate 16 has a flange 18 which mates with the funnel 14 along a planar seal line 20.

A shadow mask 22 masks a phosphor screen 24 on the inside surface of the faceplate 16 in such a way as to assure that the three electron beams generated by the three electron guns in the neck 12 of the tube (not shown) fall only on the appropriate phosphor elements.

The funnel 14 has implanted therein an anode button 26 serving as an access opening for introducing a high voltage into the interior of the bulb. A conductive coating 28 on the inside surface of the funnel 14 is in electrical contact with the anode button 26. By other means not shown, high voltage on the coating 28 is transferred to the screen 24 and to the shadow mask 22 such that the entire bulb enclosure in the funnel-faceplate region is a field free region.

The present invention will now be described—first the structure which cooperates to define the novel system and secondly the functions performed by the various system components. The illustrated preferred embodiment contains the novel multi-function system of the present invention for collectively performing the necessary magnetic shielding, degaussing, implosion protection, and tube mounting functions.

One important element of the system of this invention is a coil 30 of electrically conductive wire engirding the flange 18 of the faceplate. The coil includes terminals 32, 34 for connecting the coil 30 to a source of degaussing current. The coil will be described in more detail below in connection with a description of its functions.

A second vital element of the present system is a metal foil shield 36 composed of a material having high permeability (particularly at low field strength) and low cohersive force. The shield 36 includes an annular enclosure portion 38 which defines an enclosure containing the coil 30.

Within the enclosure defined by the annular enclosure portion 38 of the shield 36 is a body 40 of adhesive or binder. The binder preferably is a thermosetting epoxy resin with mineral fiber fill.

Finally, the present system includes a plurality of L-shaped brackets, preferably one at each corner of the tube if of the popular rectangular type. One of the brackets is shown at 42.

The brackets 42 are retentively captured against the flange 18 of the faceplate 16 by the coil 30 and are locked in place by the body 40 of the binder. The brackets serve as an instrumentality by which the tube may be mounted on a television chassis or cabinet. The brackets 42 have holes 44 to permit screw or bolt mounting of the tube. The brackets may be composed of any suitable material such as steel, or if it is desirable that they be electrically non-conductive, of alkyd resin with mineral fiber fill.

The functions of the various structured components of the system of this invention will now be described in more detail. The annular enclosure portion 38 of the shield 36 confines and defines the configuration of the body 40 of binder. The body of binder, reinforced by the coil 30, provides effective implosion protection for the bulb 10. This has been demonstrated in preliminary laboratory tests. This one function of the coil 30 is to serve as a reinforcing element in an implosion protection system.

A second function of the coil is to assist in the degaussing of the cathode ray tube. As is well known, it is necessary to "degauss" a television color cathode ray tube periodically in order to abate residual stray magnetic fields within the tube. In prior art systems, degaussing is typically accomplished by a coil existing as a separate component of the tube assembly and serving no other purpose then to degauss the tube. By connecting the terminals 32, 34 to a source of degaussing current, residual magnetic fields in the tube are abated.

A third function of the coil is to serve as a retainer for the mounting brackets 42 before they have become rigidified in the body 40 of cement.

The coil 30 of wire may be of various compositions and specifications. By way of example it may comprise 30–80 turns of 22 gauge steel wire with an ultimate tensile strength, for example of 40,000–60,000 psi. Alternatively, the wire may be composed of other suitable materials such as aluminum hardened copper or beryllium-copper. The sheath on the wire may be a composite multi-layer structure having plural insulation coatings of adequate dielectric strength with an overcoat of B stage (thermosetting) epoxy resin. This sheath on the wire is important in the formation of the coil and in the subsequent rigidification of the coil in the body 40 of binder after the coil has been assembled on the bulb 10. This subject will be discussed below.

The shield 36 is preferably composed of an 8–10 mil foil of a highly ferromagnetic material such as a decarburized and grain-oriented steel, and serves to perform the magnetic shielding for the bulb interior. By forming the annular enclosure portion 38 of the shield as an integral part thereof, significant cost savings are effected. The shielding 36 has a cut-out 37 to permit avoidance of the anode button 26.

The magnetic shield may serve as an outer conductor, if it is adhered uniformly and intimately to the outer surface of the funnel. However, because this requires the application of an adhesive, it may prove more costly to attempt to encompass the outer conductor function in the magnetic shield than to provide a more conventional outer coating on the outer surface of the funnel. As stated, it is standard practice to provide an electrically conductive coating on the outer surface of the funnel of a television CRT, which outer coating cooperates with a conductive inner coating on the interior of the funnel to define a large capacitor for smoothing the screen voltage waveform.

Thus, in summary, the system of this invention, including the coil 30, the shield 36, the body 40 of binder and the mounting brackets 42 define a system which, at a cost very substantially below that of standard structures providing these functions, serves to implosion protect the tube as well as to provide the degaussing, magnetic shielding, and tube mounting functions for the tube.

The method of making and assembling the system of the invention will now be described. The magnetic shield 36 is made by cutting it to dimension in halves from a sheet of 8–10 mil decarburized steel and lacquered. The two halves are stamped and welded to configure the shield in jacket form.

The coil 30 is preferably performed on a mandrel. The coil may be wound by conventional coil winding machinery and methods. After the coil is wound, or as the coil is being wound, an adhesive or binder may be applied to cause the coil to retain its shape on the mandrel. After the coil has been rigidified, terminals 32, 34 are attached. The coil is removed from the mandrel for later application to the bulb.

Alternatively, and preferably, the wire has a sheath which is composed of a thermosetting material such as "B" stage epoxy resin which polymerizes at a relatively high temperature. After the coil is wound, an electrical current is passed through it, raising the temperature of the coil to cause polymerization of the resin and subsequent hardening of the coil. The energization of the coil is then ceased and the coil is permitted to cool, causing it to become a rigid body. The coil may be wound on inserts which simulate the configuration of the brackets 42. To assemble the multi-function structure of this invention on a color CRT bulb 10, the bulb and brackets 42 are held in a fixture. The preformed coil 30 is attached to the shield 36, with the annular portion 38 surrounding the coil 30. This sub-assembly is placed on the bulb over the brackets 42 being held accurately in the fixture.

The body 40 of binder is formed by introducing the binder over the coil in liquid form or by means of a preformed ring or sleeve of binder which is placed first over the flange 18 before the coil-shield sub-assembly is positioned on the bulb. A current is passed through the coil 30 to again heat the coil and plasticise the coil sheath and the surrounding body 40 of binder. Pressure may be applied to the annular enclosure portion 38 of the shield 36 as the coil 30 is energized such that the body 40 and the coil 30, as well as the brackets 42, form a rigid mass capable of protecting the bulb against implosion.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a color television picture tube having a glass bulb including a funnel and a faceplate with a rearward flange which mates with and is sealed to said funnel, a multi-function system comprising:

a pre-formed coil of electrically conductive wire engirding said flange of said faceplate, said coil including terminal means for connecting said coil to a source of degaussing current for abating residual stray magnetic fields within the tube;

annular enclosure means surrounding said flange and defining an enclosure containing said coil; and a body of hardened binder in said enclosure whose configuration is defined by said enclosure means, reinforced by said coil of wire and serving to provide implosion protection for said tube.

2. The system defined by claim 1 wherein said enclosure means constitutes an integral part of a high permeability shield encompassing a major part of said bulb to shield said bulb from ambient magnetic fields.

3. The system defined by claim 1 wherein said combination includes a plurality of spaced tube mounting brackets which are retentively captured against said flange by said coil and locked in place by said body of binder.

4. In a color television picture tube having a glass bulb including a funnel and a faceplate with a rearward flange which mates with and is sealed to said funnel, the combination comprising:

means defining a coil of wire engirding said flange of said faceplate;

a high permeability metal foil shield encompassing a major part of said bulb to shield said bulb from ambient spurious magnetic fields, said shield including an integral annular enclosure means surrounding said faceplate flange and defining an enclosure containing said coil; and a body of hardened binder in said enclosure whose configuration is defined by said enclosure means, reinforced by said coil of wire and serving to provide implosion protection for said tube.

5. The system defined by claim 4 wherein said wire is electrically conductive and said coil is a degaussing coil as well as an implosion protector, said coil including terminal means for connecting said coil to a source of degaussing current.

6. The system defined by claim 4 wherein said system includes a plurality of spaced tube mounting brackets which are retentively captured against said flange by said coil and locked in place by said body of cement.

7. In a color television picture tube having a glass bulb including a funnel and a faceplate with a rearward flange which mates and is sealed to said funnel, a multifunction system comprising:

a pre-formed coil of electrically conductive wire engirding said flange of said faceplate in a relaxed state, said coil including terminal means for connecting said coil to a source of degaussing current for abating residual stray magnetic fields within the tube;

a high permeability metal foil shield encompassing a major part of said bulb to shield said bulb from ambient magnetic fields, said shield including an integral annular enclosure means surrounding said faceplate flange and defining an enclosure containing said coil;

body of hardened binder in said enclosure whose configuration is defined by said enclosure means, reinforced by said coil of wire and serving to provide implosion protection for said tube; and a plurality of spaced tube mounting brackets which are retentively captured against said flange by said coil and locked in place by said body of binder.

* * * * *